US011294504B2

(12) United States Patent
Guedon et al.

(10) Patent No.: US 11,294,504 B2
(45) Date of Patent: Apr. 5, 2022

(54) OVERSAMPLED HIGH SIGNAL TO NOISE RATIO ANALOG FRONT END FOR TOUCH SCREEN CONTROLLERS

(71) Applicant: STMicroelectronics Asia Pacific Pte Ltd, Singapore (SG)

(72) Inventors: Yannick Guedon, Singapore (SG); Leonard Liviu Dinu, Singapore (SG); Hugo Gicquel, Grenoble (FR)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 40 days.

(21) Appl. No.: 16/704,212

(22) Filed: Dec. 5, 2019

(65) Prior Publication Data

US 2020/0192520 A1 Jun. 18, 2020

Related U.S. Application Data

(60) Provisional application No. 62/779,577, filed on Dec. 14, 2018.

(51) Int. Cl.
  *G06F 3/041* (2006.01)
  *G06F 3/044* (2006.01)

(52) U.S. Cl.
  CPC ........... *G06F 3/0418* (2013.01); *G06F 3/044* (2013.01); *G06F 3/04166* (2019.05)

(58) Field of Classification Search
  CPC .... G06F 3/044; G06F 3/0418; G06F 3/04166; G06F 3/04182
  See application file for complete search history.

(56) References Cited

U.S. PATENT DOCUMENTS

| 9,256,335 | B2 | 2/2016 | Jain et al. |
| 9,886,142 | B2 | 2/2018 | Tiew |
| 9,973,199 | B2 | 5/2018 | Byun et al. |
| 2014/0292705 | A1* | 10/2014 | Tan ........................ G06F 3/044 345/174 |
| 2016/0187961 | A1 | 6/2016 | Elibol et al. |
| 2016/0349872 | A1* | 12/2016 | Hargreaves ........... G06F 3/0446 |
| 2017/0212635 | A1 | 7/2017 | Cordeiro et al. |
| 2018/0004353 | A1 | 1/2018 | Shin |

OTHER PUBLICATIONS

Heo, Sanghyun et al: "Dynamic Range Enhanced Readout Circuit for a Capacitive Touch Screen Panel with Current Subtraction Technique," 2014 IEEE, pp. 327-330.
Hwang, Hyunseok, et al: "A 1.8-V 6.9-mW 120-fps 50-Channel Capacitive Touch Readout With Current Conveyor AFE and Current-Drive ΔΣ ADC," IEEE Journal of Solid-State Circuits, 2017, 15 pages.

* cited by examiner

*Primary Examiner* — Yaron Cohen
(74) *Attorney, Agent, or Firm* — Crowe & Dunlevy

(57) ABSTRACT

A touch screen controller includes an input stage configured to receive and condition a touch output from a touch matrix to produce a touch signal. An accumulation stage is configured to receive the touch signal and accumulate the touch signal to produce an accumulated output. The accumulated output is digitized by an analog to digital converter to produce a touch strength value. A given amount of charge is subtracted from or added to accumulated output during a next accumulation if the touch strength value is greater than an upper threshold or less than a lower threshold. This avoids saturation of components in the touch screen controller and therefore increases the signal to noise ratio.

37 Claims, 6 Drawing Sheets

OVERSAMPLED HIGH SIGNAL TO NOISE RATIO ANALOG FRONT END FOR TOUCH SCREEN CONTROLLERS

RELATED APPLICATION

This application claims priority to U.S. Provisional Application for Patent No. 62/779,577, filed on Dec. 14, 2018, the contents of which are incorporated by reference in their entirety.

TECHNICAL FIELD

This disclosure is directed to the field of mutual capacitance sensing, and in particular, to a design for a high signal to noise ratio analog front end for touch screen controllers that utilizes oversampling and accumulation with a feedback mechanism.

BACKGROUND

Touch screen devices are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as made by a finger or stylus, can be detected.

Two common capacitive touch sensing techniques or modes that may be performed on touch screens are mutual capacitance sensing and self capacitance sensing. In a mutual capacitance sensing mode, shown in FIGS. 1A-1B, a drive signal is applied to a subset of the lines referred to as drive lines, and capacitance values are measured at a subset of the lines referred to as sense lines, with it being understood that the sense lines cross the drive lines in a spaced apart fashion therefrom. Each crossing of drive line and sense line forms a capacitive intersection. This electric field between a drive line and a sense line, in the absence of a touch, can be seen in FIG. 1A.

Since bringing a finger or conductive stylus near the surface of the touch screen changes the local electric field, this causes a reduction in the capacitance between the drive lines and the sense lines (the "mutual" capacitance), and the capacitance change at every individual capacitive intersection can be measured to accurately determine the touch location. This change of electric field due to the presence of a finger can be seen in FIG. 1B, where the finger "steals" charge, and thus the capacitance between the drive line and sense line is reduced.

Since mutual capacitance sensing allows the measuring of each intersection between drive line and sense line individually, the output of mutual capacitance sensing is a two-dimensional matrix of values, with one value for each capacitive intersection (crossing between drive line and sense line). Thus, it can be appreciated that mutual capacitance sensing allows multi-touch operation where multiple fingers or styli can be accurately tracked at the same time.

In a self capacitance sensing mode, shown in FIGS. 2A-2B, the drive signal is applied to every line, regardless of orientation. This application of the drive signal in the absence of a touch can be seen in FIG. 2A. Bringing a finger or conductive stylus near the surface of the touch screen changes the local electric field, as shown in FIG. 2B, increasing the capacitance between the drive line or sense line of interest and ground (the "self capacitance") in this instance. However, since all lines are driven, the capacitance change cannot be measured on a per capacitive intersection basis. Therefore, the output of self capacitance sensing is two one dimensional arrays of values, with one value for each line.

It can be appreciated that since mutual capacitance is measured at each intersection of drive line and sense line during mutual capacitance sensing, signal to noise ratio is comparatively small with mutual capacitance sensing as opposed to self capacitance sensing. Therefore, further improved noise reduction techniques are in demand to help increase this signal to noise ratio during mutual capacitance sensing.

SUMMARY

Disclosed herein is a touch screen controller including an input stage configured to receive a touch output from a touch matrix and to condition the received touch output to produce a touch signal, an accumulation stage configured to receive the touch signal and accumulate the touch signal produce an accumulated output, and an analog to digital converter configured to digitize the accumulated output to produce a touch strength value, and the accumulation stage may be further configured to subtract a given amount of charge during a next accumulation if the touch strength value exceeds a first threshold.

The accumulation stage may include an accumulator circuit configured to receive the touch signal and accumulate the touch signal to produce the accumulated output, and a switched capacitor circuit configured to subtract a first amount of charge from the accumulated output if the touch strength value exceeds the first threshold.

The first amount of charge may be the given amount of charge.

The accumulation stage may include a second switched capacitor circuit configured to subtract a second amount of charge from the accumulated output if the touch strength value exceeds a second threshold less than the first threshold but does not exceed the first threshold.

The given amount of charge may be equal to the second amount of charge.

The accumulation stage may include a third switched capacitor circuit configured to subtract a third amount of charge from the accumulated output if the touch strength value exceeds a third threshold less than the second threshold but does not exceed the first threshold and the second threshold.

The given amount of charge may be equal to the second amount of charge.

The second amount of charge may be equal to one half of the first amount of charge, and the third amount of charge may be equal to one quarter of the first amount of charge.

One of the first, second, and third switched capacitor circuits may contain a plurality of sub-switched capacitor circuits each being capable of subtracting an associated one of the first, second, and third amounts of charge.

The accumulation stage may include a current to voltage converter configured to receive the accumulated output and process the accumulated output.

The accumulation stage may subtract the given amount of charge during the next accumulation if most significant bits of the touch strength value exceed the first threshold.

The analog to digital converter may digitize the accumulated output to produce the touch strength value via oversampling.

The input stage may include a capacitance to current converter cascaded with a common mode feedback and offset cancelation circuit.

Processing circuitry may be configured to compare the touch strength value to the first threshold, and to generate a control signal for the accumulation stage that results in the accumulation stage subtracting the given amount of charge during the next accumulation if the touch strength value exceeds the first threshold.

The accumulation stage may be further configured to add a given amount of charge during a next accumulation if the touch strength value is less than a second threshold.

Method aspects are also contained herein. One method disclosed herein includes receiving a touch output from a touch matrix and to conditioning the received touch output to produce a touch signal, accumulating the touch signal to produce an accumulated output, digitizing the accumulated output to produce a touch strength value, comparing the touch strength value to a first threshold, and if the touch strength value exceeds the first threshold, subtracting a given amount of charge from the touch signal prior to accumulation.

This method may also include comparing the touch strength value to a second threshold less than the first threshold, and if the touch strength value exceeds the second threshold but does not exceed the first threshold, subtracting a second amount of charge from the touch signal, the given amount of charge being the second amount of charge.

This method may also include comparing the touch strength value to a third threshold less than the second threshold, and if the touch strength value exceeds the third threshold but does not exceed the first threshold and the second threshold, subtracting a third amount of charge from the touch signal, with the given amount of charge being the third amount of charge, and with the third amount of charge being less than the second amount of charge.

The second amount of charge may be equal to one half of a first amount of charge, and the third amount of charge may be equal to one quarter of the first amount of charge.

Another method disclosed herein includes receiving a touch at a touch matrix and producing a touch signal, accumulating the touch signal to produce an accumulated output, and in response to the accumulated output being above an upper threshold or below a lower threshold, adding or subtracting charge from the accumulated output so as to modify the accumulated output to be within upper and lower thresholds.

This method may include digitizing the accumulated output to produce a touch strength value, and determining whether the accumulated output is above the upper threshold or below the lower threshold by comparing the touch strength value to the upper threshold or the lower threshold.

The upper threshold may represent a positive voltage value, and the lower threshold may represent a negative voltage value.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
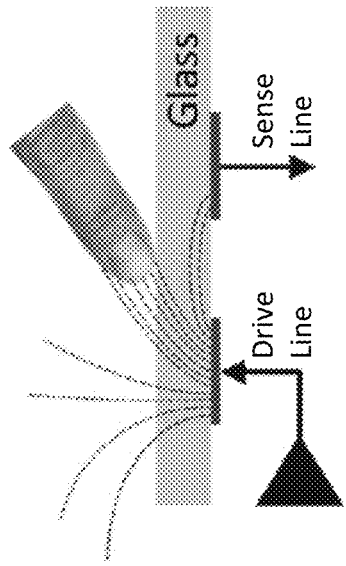
FIG. 1A is a diagram showing field lines of a touch sensor operating in a mutual strength capacitance sensing mode in an absence of a touch.
Figure 1B:
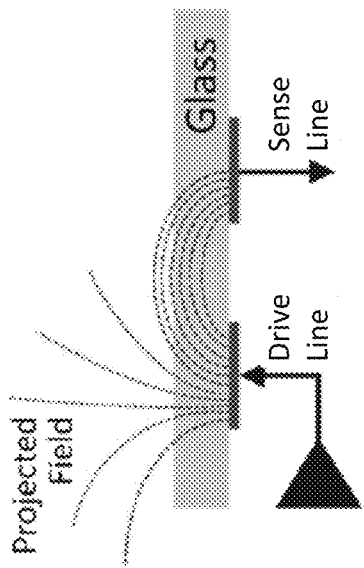
FIG. 1B is a diagram showing field lines of a touch sensor operating in a mutual strength capacitance sensing mode in a presence of a touch.
Figure 2A:
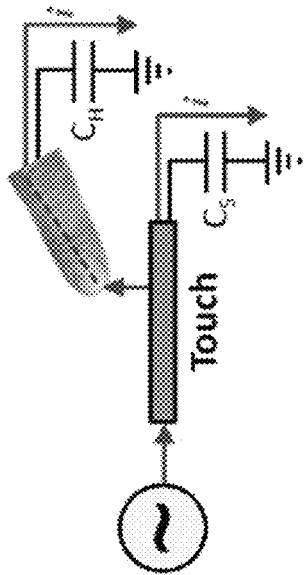
FIG. 2A is a diagram showing capacitances of a touch sensor operating in a touch strength capacitance sensing mode in an absence of a touch.
Figure 2B:
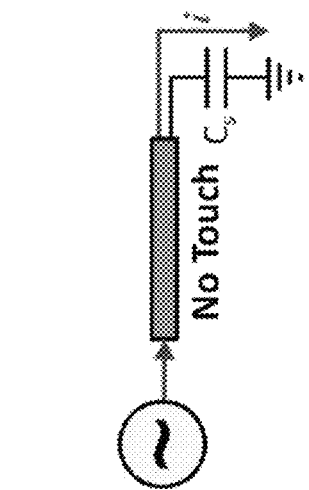
FIG. 2B is a diagram showing capacitances of a touch sensor operating in a touch strength capacitance sensing mode in a presence of a touch.
Figure 3:
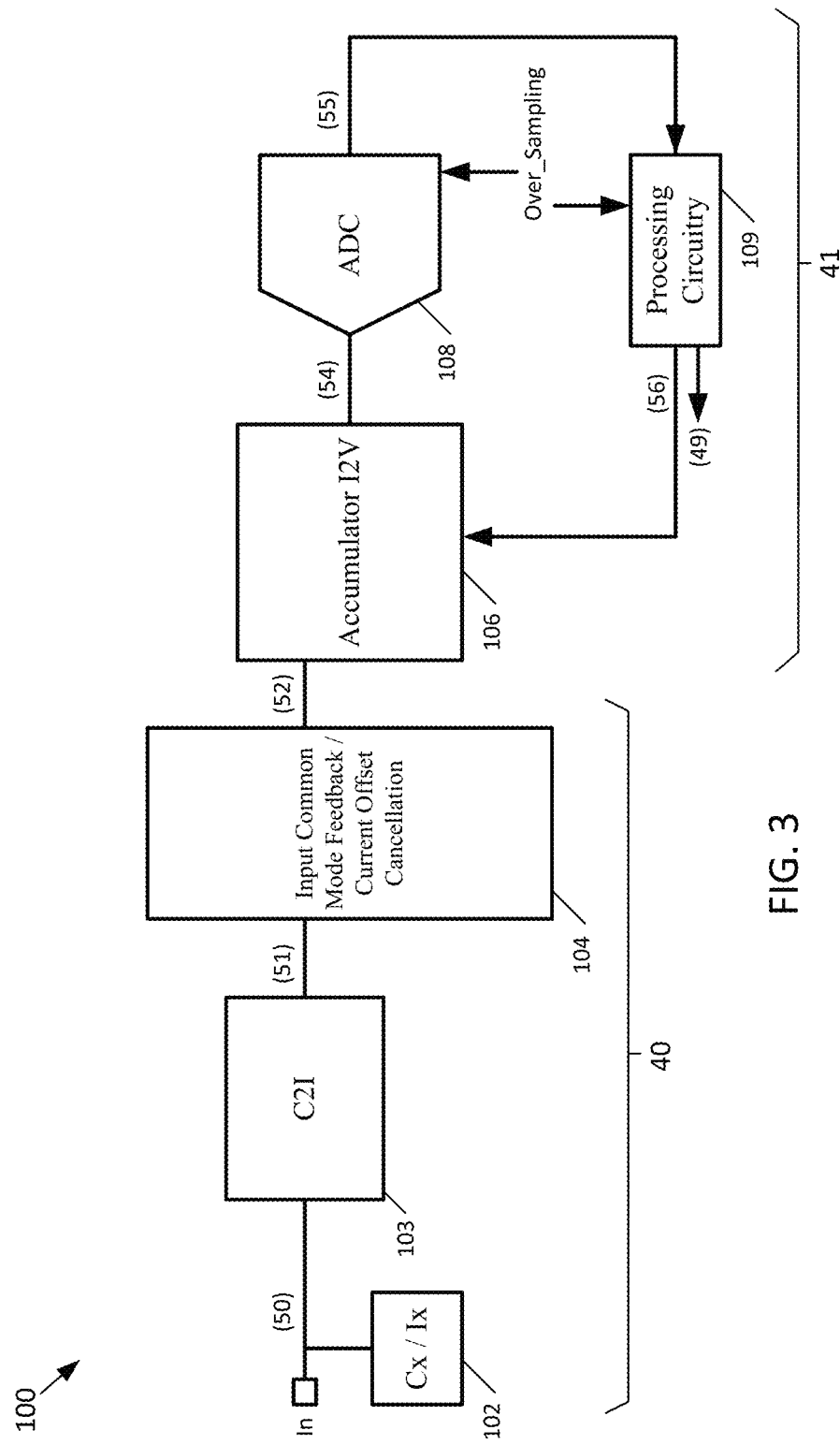
FIG. 3 is a block diagram of a touch screen controller in accordance with this disclosure.

Now described with reference to FIG. 3 is a touch screen controller 100 for use with a touch screen device, such as a smartphone, tablet, laptop, or smartwatch. The touch screen controller 100 includes input circuitry 40 comprised of a capacitance to current (C2I) converter 103 receiving a touch at node 50 which is a sense line of a touch matrix of the touch screen device. The capacitance to current converter 103 converts the touch output (sensed capacitance) 50 to a current 51. As a touch capacitance signal may contain a variable portion reflecting the variation of capacitance to be measured, and as it may also contain a constant portion which is not of interest as far as touch information is concerned, the touch controller 100 may contain some circuitry for cancelling capacitance or current at node 50. This is represented by block 102. Circuitry 102 may comprise switching capacitance circuitry (Cx) capable of cancelling calibrated charges at node 50 and used typically for mutual sensing parasitic capacitance cancellation, and it may also comprise current source (Ix) capable of also cancelling calibrated charge at node 50 by application of calibrated current during calibrated time and typically used for cancellation of self-sensing parasitic capacitance. The input circuitry 40 also includes an input common mode feedback and current offset cancellation circuit 104 that receives the current 51 and removes common mode signals (in the instance of an alternative embodiment utilizing differential sensing) and cancels current offsets to produce a touch signal 52.

The touch signal 52 is received by the accumulation stage 41, which includes an accumulator and capacitor based discharge circuit 106. The accumulator and capacitor based discharge circuit 106 accumulates the touch signal 52 to produce an accumulated output 53. The accumulated output 53 (referring to FIG. 4) is the as accumulated output in a sense that charges comings from the capacitance to current converter 103, current offset cancellation circuit 104, and accumulator and capacitor based discharge circuit 106 are summed at node 53. Accumulated output denomination will be used with same meaning in the further descriptions.

The accumulation stage 41 includes a current to voltage (I2V) converter, which receives the accumulated output 53 after each accumulation and converts it from a current to a voltage to produce an intermediate output 54, which is then in turn digitized by analog to digital converter (ADC) 108 to produce a digital word 55 that is received by processing circuitry 109. Note that sampling is performed by the ADC 108 a few times between edges of the drive signal used by the touch screen controller 100, and that if the ADC 108 performs the sampling between edges (rising or falling) of the drive, touch signal 52 is however inverted only on falling/rising edges of the drive signal prior to accumulation. In other words ADC 108 performs oversampling of the signal 54 between two edges of the drive signal while accumulation occurs only at edges of the drive signal. Each digital word 55 can represent a positive or a negative value, with a digital word of 0 (all bits of the digital word being zero) representing a full negative voltage swing value (representing the most negative voltage output producible by the current to voltage converter 107 (referring to FIG. 4), and with a digital word of 1 (all bits of the digital word being one) representing a full positive voltage swing value (representing the most positive voltage output producible by the current to voltage converter 107).

Each digital word 55 output by the ADC 108 to the processing circuitry 109 represents both touch data and noise. Each digital word 55 output by the ADC 108 to the processing circuitry 109 is added to previous outputs of a sensing frame until the sensing frame is complete, and then the total is processed and output as a touch strength value 49 to be used by other parts of the touch screen controller 100. The processing circuitry 109 generates a suitable control signal 56 for the accumulator and capacitor based discharge circuit 106 based upon the current digital word 55. Note that "sensing frame" here refers to a time period encompassing the generation of each digital word 55 used to generate a single touch strength value 49.

A "sensing frame" s therefore composed of a succession of drive signal pulses (e.g., 128 pulses corresponding to 256 edges), and between each edges a succession of samplings by ADC 108 may be performed (e.g., 8 samplings). The overall "sensing frame" may therefore make use of 256× 8=2048 ADC data frames, while the touch signal is accumulated 256 times in the example. Since the ADC sampling rate faster than the drive signal rate, this is called oversampling. Oversampling helps provide an accurate real-time view of the output of the ADC 108, and thus an accurate real-time view of the signal and noise, in turn allowing for more accurate and more effective noise cancellation.

Since the current to voltage converter 107 is not an ideal component, it should be understood that it has a maximum positive voltage output and a minimum negative voltage output, respectively being the highest and lowest voltages that the current to voltage converter 107 can output. Therefore, where an input to the current to voltage converter 107 would produce a voltage higher than the maximum positive voltage output or lower than the minimum negative voltage output, clipping occurs and the output of the current to voltage converter 107 is not accurate. This means that where excessive noise results in clipping, the signal to noise ratio lowers, and touch data can be lost. In addition, the current to voltage converter 107 may operate most linearly (closest to ideal) within a relatively narrow range, such as between one quarter of the maximum positive voltage output and one quarter of the minimum negative voltage output.

So as to avoid clipping of the output of the current to voltage converter 107 and to avoid operating the current to voltage converter 107 in nonlinear regions, when the digital word 55 output by the ADC 108 indicates that the accumulated output 54 (output by the current to voltage converter 107) is at a voltage that is outside of the aforementioned narrow range, the processing circuitry 109 operates circuitry within the accumulator and capacitor based discharge circuit 106 via a generated control signal 56 so as to drive the accumulated output 54 back toward being within the narrow range by adding or subtracting an appropriate amount of charge to the accumulated output 53 at the next accumulation or subtracting an appropriate amount of charge from the accumulated output 53 at the next accumulation, thereby extending the dynamic range of the current to voltage converter 107. Note that the processing circuitry 109 takes the amount of charge added to or subtracted from the accumulated output 53 (which can be thought of as an offset) into account when determining the touch strength value 49. Further details will be given below.

Figure 4:
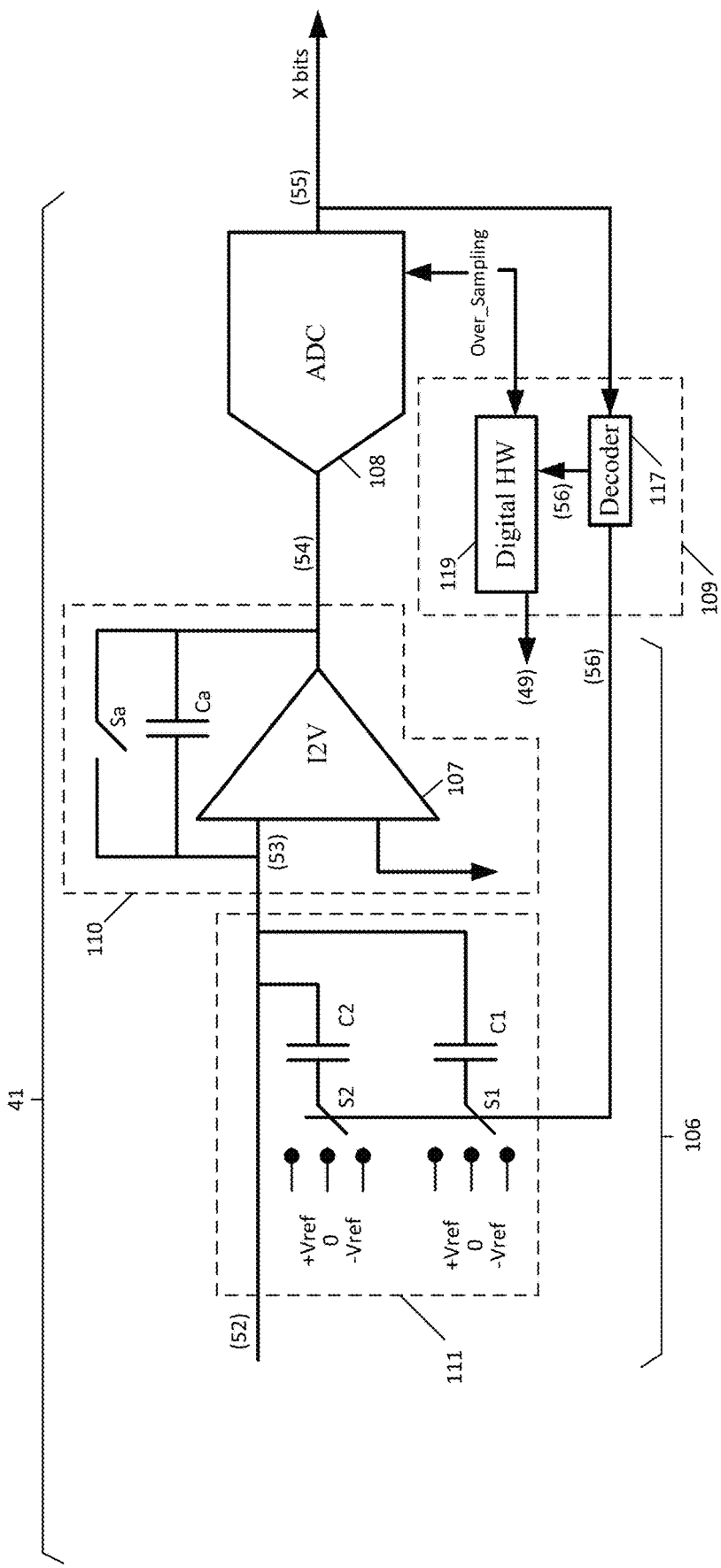
FIG. 4 is a schematic block diagram of the accumulator capacitor based discharge circuit of FIG. 3.

Shown in FIG. 4 is the accumulation stage 41 in greater detail. It is to be highlighted that the symbolic representation on FIG. 4 shows 52 and 53 as two distinct nodes. However in actual implementation, the accumulation process as well as the discharge process takes place at a single node which is 53 and which is the input node of the I2V 107. Stage 41 includes switched capacitor circuit 111 whose function is to complete the discharge process at node 53, while amplifier 107 and capacitance Ca are combined within element 110 for performing accumulation of incoming signal at accumulated output 53 (in the sense of accumulated currents) and current to voltage conversion to provide the accumulated output 54 (in the sense of accumulated voltage after current to voltage conversion). Switch Sa is used as a reset element for initiating the accumulation process. The switch Sa is closed prior to a new "sensing frame" (for resetting the system), and may remain open during the whole "sensing frame". However nothing prevents the performing of resets (closings of the switch Sa) more often if interest is found in doing so.

The switched capacitor circuit 111 includes a capacitor C1 coupling the accumulated output 53 to switch S1 and a capacitor C2 coupling the accumulated output 53 to switch S2. Switch S1 selectively switches capacitor C1 between a positive reference signal +Vref, ground, a negative reference signal −Vref, while switch S2 selectively switches capacitor C2 between the +Vref, ground, and −Vref signals. In this example, ground serves as a common mode voltage about which the maximum positive voltage output by the current to voltage converter 107 and minimum negative voltage output by the current to voltage converter 107 is defined. Understand that, in some instances, the common mode voltage may not be ground, and may instead be a positive or negative voltage. Also understand that in some instances, the common mode voltage may be positive enough or negative enough such that what has been described as a maximum positive voltage output and a minimum negative voltage output simply become upper and lower thresholds of the same sign. Note that capacitors C1 and C2 may be equal in capacitance, or in some instances, may have difference capacitances.

In operation, the discharge, accumulation and current to voltage conversion described above are performed by 111 and 110 at node 53, and ADC 108 operates as described above. Here, it is shown that the processing circuitry 109 includes decoder or control circuitry 117 that performs the comparisons of the digital word 55 to codes representing the maximum positive voltage output and a minimum negative voltage output (or upper and lower thresholds, as explained above), and that generates control signal 56 for the switched capacitor circuit 111.

Note that when the digital word 55 reaches the maximum positive voltage output or falls below the minimum negative output, or reaches a given positive threshold (which may be a fraction of the maximum positive voltage output) or falls below a given minimum threshold (which may be a fraction of the minimum negative output), the decoder 117 calculates how much charge is to be extracted from or added to the accumulated output 53 and sends a control signal 56 to the switched capacitor circuit 111 that appropriately controls the switches S1 and S2 until the digital word 55 is in a desired range (such as between one quarter of the maximum positive voltage output and one quarter of the minimum negative positive input) at the next sampling. The control signal 56 is also sent to the digital hardware 119 so that it can be taken into account in any further processing performed before outputting the touch strength value 49.

The control signal 56 may in some instances be a three bit signal, with one bit indicating sign, and two bits indicating how much charge is to be extracted from or added to the accumulated output 53. Using a multi-bit signal would allow management of multiple different thresholds in the positive range and in the negative range.

Note that use of the switch and capacitor pairs S1, C1 and S2, C2 may be alternated during operation so that there is sufficient time for charge transfer to occur, particularly when oversampling is used. If oversampling is not to be used, then the switch and capacitor pair S2, C2 may be eliminated from the design. Also note that there may be multiple (e.g., three) separate sets of switch and capacitor pairs, each set to be capable of adding or subtracting a different amount of charge, corresponding to a different detection threshold.

In an example of three sets, a first set may be capable of adding or subtracting an amount equal to one quarter of the maximum positive voltage output or one quarter of the minimum negative voltage output of the current to voltage converter 107, a second set may be capable of adding or subtracting an amount equal to one half of the maximum positive voltage output of or one half of the minimum negative voltage output of the current to voltage converter 107, and a third set may be capable of adding or subtracting an amount equal to the maximum positive voltage output or minimum negative voltage output of the current to voltage converter 107. The different sets may be operated together so as to give a variety of values by which the charge from the accumulated output 53 may be added or subtracted. This allows for accuracy and ease in driving the accumulated output 53 back toward being within the narrow range (e.g. between one quarter of the maximum positive voltage output and one quarter of the minimum negative voltage output) over which the current to voltage converter 107 operates most linearly. Thus, the decoder 117 may compare the digital word 55 to an equal number of thresholds or values (e.g. full maximum positive voltage output, half maximum positive voltage output, one quarter maximum positive voltage output, one quarter minimum negative voltage output, one half minimum negative voltage output, and full minimum negative voltage output).

In some instances, more than two switch and capacitor pairs may be used for each range of the potential voltage output swing of the ADC 108, and the number of such pairs can be set according to the sampling rate. In addition, there may be any number of sets of switch and capacitor pairs, with each set being capable of adding or subtracting a different fraction of the potential voltage output swing of the ADC 108.

Figure 5:
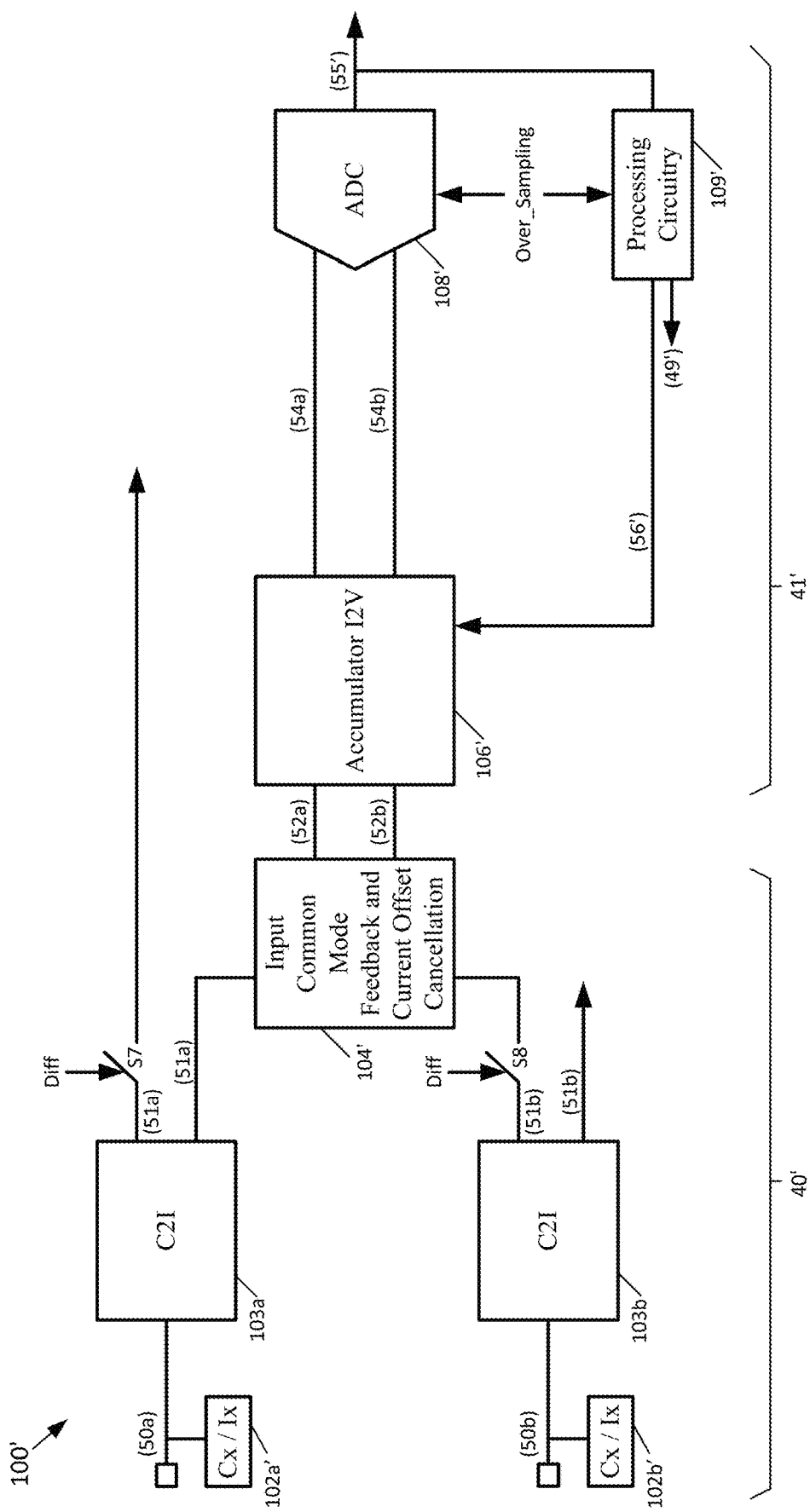
FIG. 5 is a block diagram of a differential touch screen controller in accordance with this disclosure.

A differential implementation of the touch screen controller 100' is shown in FIG. 5. Here, the input is double ended, receiving an input at node 50*a* which is a sense line of a touch matrix of the touch screen device, and input at node 50*b* which is another sense lines of a touch matrix of the touch screen device. A first capacitance to current converter 103*a* converts the touch output (sensed capacitance) 50*a* to a current 51*a*, and a second capacitance to current converter 103*b* converts the touch output 50*b* to a current 51*b*.

The current 51*a* is directly received at the input common mode feedback and current offset cancellation circuit 104'. The current 51*b* is passed through switch S8 to the input common mode feedback and current offset cancellation circuit 104'. Therefore, notice that if the switch S8 is closed, the touch screen controller 100' operates differentially, but if switch S8 is opened, the touch screen controller 100' operates in a single ended fashion.

The input circuitry 40' also includes the input common mode feedback and current offset cancellation circuit 104' that receives the currents 51*a* and 51*b* in differential operation and removes common mode signals and cancels current offsets to produce touch signals 52*a* and 52*b*. Note that if the touch screen controller 100' is operating as single ended, the input common mode feedback and current offset cancellation circuit 104' splits the charge from current 51*a* to produce touch signals 52*a* and 52*b*.

The touch signals 52*a* and 52*b* are received by the accumulation stage 41', which includes an accumulator and a capacitor based discharge circuit 106'. The accumulator and capacitor based discharge circuit 106' accumulates the touch signals 52*a* and 52*b* to produce accumulated outputs 53*a* and 53*b* (referring to FIG. 6).

The representation on FIG. 5 is a double ended version of FIG. 3 (describing the single ended solution). Take note that in the implementation shown in FIG. 6, the accumulation process as well as the discharge process takes place at a single node which is 53*a*, 53*b* and which there is the input node of the I2V 106'. Stage 41' includes a switched capacitor circuit whose function is to complete the discharge process at node 53*a*, 53*b* as shown as well in FIG. 6, while a differential amplifier and capacitances are combined for performing accumulation of the incoming signal from nodes 52*a*, 52*b* to provide accumulated output (in the sense of accumulated currents/charges) and current to voltage conversion to provide the accumulated output 54*a*, 54*b* (in the sense of accumulated voltage). A switch is used as a reset element for initiating the accumulation process. The switch is closed prior to a new "sensing frame" (for resetting the system), and may remain open during the whole "sensing frame". However nothing prevent of performing more often closing (reset) of the system if any interest is found in doing so.

The accumulation stage 41' includes a current to voltage converter 107', which receives the accumulated outputs 53*a* and 53*b* (in sense of accumulated currents) after each accumulation and converts them to voltages to produce intermediate outputs 54*a* and 54*b*, which are then in turn digitized by analog to digital converter (ADC) 108' to produce a digital word 55' that is received by processing circuitry 109'.

Each digital word 55' output by the ADC 108' to the processing circuitry 109' is added to previous outputs of a sensing frame until the sensing frame is complete, and then the total is output as a touch strength value 49' to be used by other parts of the touch screen controller 100'. The processing circuitry 109' generates a suitable control signal 56' for the accumulator and capacitor based discharge circuit 106' based upon the current digital word 55'. The control signal 56' operates switches in the accumulator and capacitor based discharge circuit 106' so as to add or subtract a suitable amount of charge from the accumulated outputs 53a and 53b and by consequence from the voltage outputs 54a and 54b though the current to voltage conversion process as explained in detail above.

Figure 6:
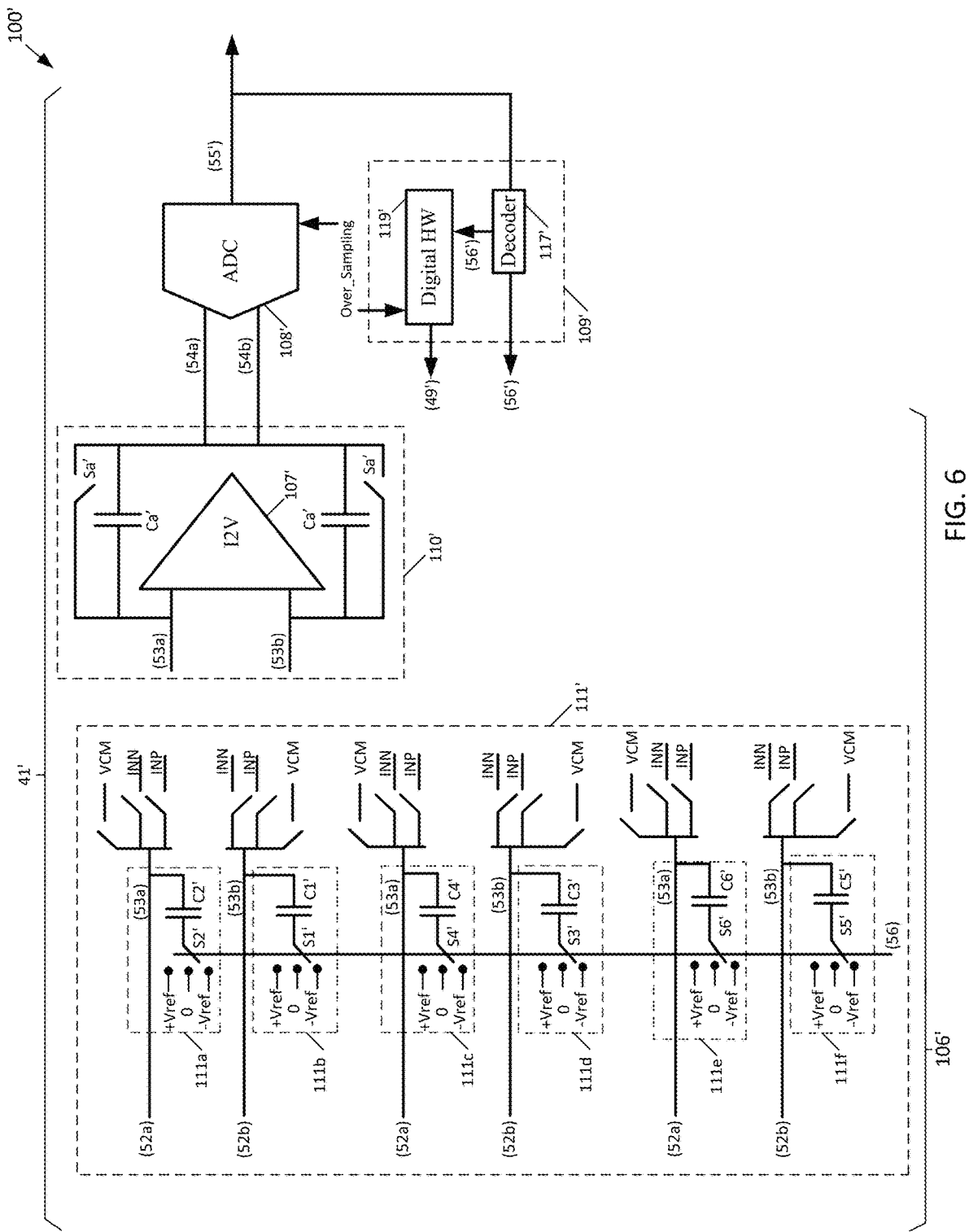
FIG. 6 is a schematic block diagram of the accumulator capacitor based discharge circuit of FIG. 5.

Shown in FIG. 6 is the accumulation stage 41' of the touch screen controller 100' in greater detail. The accumulation stage 41' includes accumulator circuit 110' and switched capacitor circuit 111' to provide the accumulated output 53 to the current to voltage converter 107'. The accumulator circuit 110' performs the accumulations of the touch signal and conversion to voltage while and ADC 108' operate as described above.

A first switched capacitor circuit 111b includes a capacitor C1' coupling the accumulated output 53b to switch S1'. Switch S1' selectively switches capacitor C1' between a positive reference signal +Vref, ground, a negative reference signal −Vref. The accumulated output 53b is selectively coupled to either node INN or INP, or to a common mode voltage.

A second switched capacitor circuit 111a includes a capacitor C2' coupling the accumulated output 53a to switch S2'. Switch S2' selectively switches capacitor C2' between a positive reference signal +Vref, ground, a negative reference signal −Vref. The accumulated output 53a is selectively coupled to either node INN or INP, or to a common mode voltage.

A third switched capacitor circuit 111c includes a capacitor C3' coupling the accumulated output 53b to switch S3'. Switch S3' selectively switches capacitor C3' between a positive reference signal +Vref, ground, a negative reference signal −Vref. The accumulated output 53b is selectively coupled to either node INN or INP, or to a common mode voltage.

A fourth switched capacitor circuit 111d includes a capacitor C4' coupling the accumulated output 53a to switch S4'. Switch S4' selectively switches capacitor C4' between a positive reference signal +Vref, ground, a negative reference signal −Vref. The accumulated output 53a is selectively coupled to either node INN or INP, or to a common mode voltage.

A fifth switched capacitor circuit 111e includes a capacitor C5' coupling the accumulated output 53b to switch S5'. Switch S5' selectively switches capacitor C5' between a positive reference signal +Vref, ground, a negative reference signal −Vref. The accumulated output 53b is selectively coupled to either node INN or INP, or to a common mode voltage.

A sixth switched capacitor circuit 111f includes a capacitor C6' coupling the accumulated output 53a to switch S6'. Switch S6' selectively switches capacitor C6' between a positive reference signal +Vref, ground, a negative reference signal −Vref. The accumulated output 53a is selectively coupled to either node INN or INP, or to a common mode voltage.

The above description illustrates three sets of switching capacitance networks used for each line 53a and 53b. Note that use of the switch and capacitor sets may be alternated during operation so that there is sufficient time for charge transfer to occur, particularly when oversampling is used. Each set may also be capable of adding or subtracting a different amount of charge, corresponding to a different detection threshold. Any set may be designed to address either purpose or both. The number of sets is not restricted to three.

Note that when the digital word 55' exceeds one quarter of the maximum positive voltage or falls below one quarter of the minimum negative voltage, the decoder 117' calculates how much charge is to be extracted from or added to the accumulated output 53' and sends a control signal 56' to the switched capacitor circuits 111a-111f that appropriately controls the switches S1', S2', S3', S4', S5' and S6' until the digital word 55' is output, at the next sampling, as being no greater than one quarter of the maximum positive voltage and no less than one quarter of the minimum negative voltage.

The control signal 56' may in some instances be a three bit signal, with one bit indicating sign, and two bits indicating how much charge is to be extracted from or added to the accumulated output 53'. Using a higher bit count signal would allow management of a higher number of detection thresholds in the positive and negative range.

The control signal 56' is also sent to the digital hardware 119' so that it can be taken into account in any further processing performed before outputting the touch strength value 49'.

Figure 7:
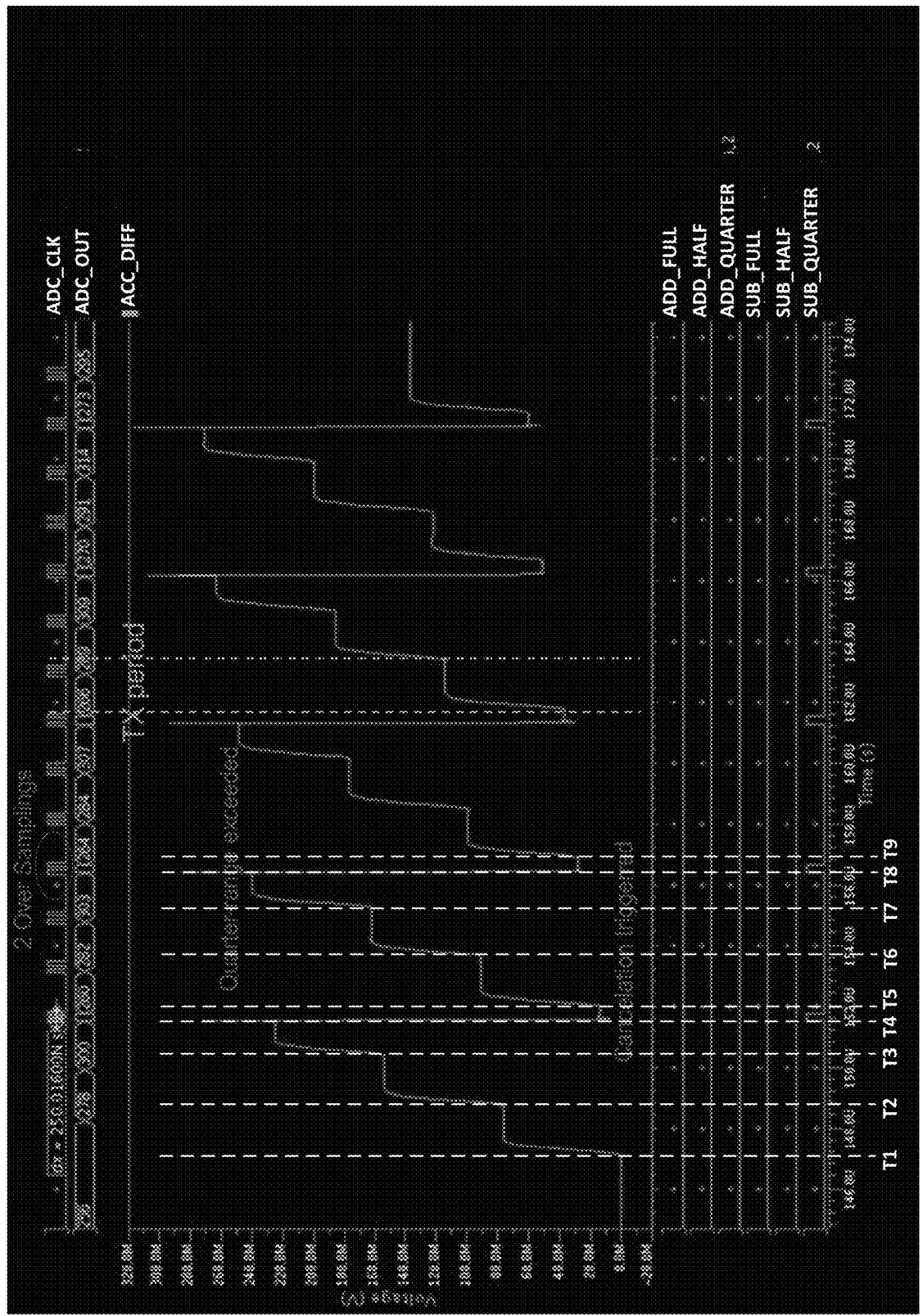
FIG. 7 is a graph showing accumulated voltage over time for the touch screen controllers disclosed herein.

Shown in FIG. 7 is a graph of the accumulated output 54' over time. In this example, 2× oversampling is used, meaning that two samples are taken per pulse of the drive signal. The sampling clock is shown as ADC_CLK, and it can be seen that there are two pulses of ADC_CLK per period of the drive signal, with periods of the drive signal being, for example, between times T1-T2, T2-T3, and T3-T5. The results of successive accumulations, shown as trace ACC_DIF, can be seen rising in voltage steps of about 75 mV between times T1-T2 and T2-T3. During the voltage step between times T3-T5, one quarter of the maximum positive voltage is reached by time T4. This is recognized by the processing circuitry 109' at time T4, which generates control signal 56' so as to cause the switched capacitor circuits 111a-111d to subtract charge equal to one quarter of the maximum positive voltage, indicated by the pulse of the SUB_QUARTER trace rising at time T4. The results of this subtraction are seen between times T4-T5, where ACC_DIF drops below 20 mV.

ACC_DIF begins to rise again at time T5, and again, rises in voltage steps of about 75 mV between times T5-T6, and T6-T7. Between times T7-T9, ACC_DIF again reaches one quarter of the maximum positive voltage at time T8, which is recognized by the processing circuitry 109', resulting in generation of a pulse of SUB_QUARTER at time T8. This results in the subtraction of charge equal to one quarter of the maximum positive voltage between times T8-T9 by the switched capacitor circuits 111a-111d.

Note that the overall voltage levels rise between times T1-T4 as compared to times T5-T8. This results from noise entering the system remaining as a residue. A total of 16 periods of the drive signal are shown in FIG. 7. From the last sample, the processing circuitry 109' can reconstitute the original signal as being equal to:

Residue+5*0.25 of maximum positive voltage=1.25*full maximum positive voltage+Residue.

It can be appreciated that the touch screen controller 100' has low power consumption due to simpler hardware than other approaches, and due to the decreased bit resolution of the ADC 108' permitted. In addition, area consumption is kept low due to the simpler hardware, and due to the reduced size capacitors used.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A touch screen controller, comprising:
an input stage configured to receive a touch output from a touch matrix and to condition the received touch output to produce a touch signal;
an accumulation stage configured to receive the touch signal and accumulate the touch signal to produce an accumulated output;
an analog to digital converter configured to digitize the accumulated output to produce a touch strength value;
wherein the accumulation stage is further configured to respond to a control signal by subtracting a given amount of charge during a next accumulation when the touch strength value exceeds a first threshold; and
processing circuitry configured to perform a digital comparison of the touch strength value to the first threshold, and to generate the control signal for the accumulation stage that causes the accumulation stage to subtract the given amount of charge during the next accumulation when the digital comparison indicates that the touch strength value exceeds the first threshold;
wherein the accumulation stage comprises:
an accumulator circuit configured to receive the touch signal and accumulate the touch signal to produce the accumulated output;
a first switched capacitor circuit configured to subtract a first amount of charge from the accumulated output as the given amount of charge in said next accumulation when the touch strength value exceeds the first threshold; and
a second switched capacitor circuit different than the first switched capacitor circuit and configured to subtract a second amount of charge from the accumulated output as the given amount of charge in said accumulation when the touch strength value exceeds a second threshold less than the first threshold but does not exceed the first threshold, the second amount of charge being different than the first amount of charge.

2. The touch screen controller of claim 1, wherein the accumulation stage further comprises a third switched capacitor circuit configured to subtract a third amount of charge from the accumulated output in said next accumulation when the touch strength value exceeds a third threshold less than the second threshold but does not exceed the first threshold and the second threshold.

3. The touch screen controller of claim 2, wherein the given amount of charge is equal to the third amount of charge.

4. The touch screen controller of claim 2, wherein the second amount of charge is equal to one half of the first amount of charge, and wherein the third amount of charge is equal to one quarter of the first amount of charge.

5. The touch screen controller of claim 2, wherein at least one of the first, second, and third switched capacitor circuits contains a plurality of sub-switched capacitor circuits each being capable of subtracting an associated one of the first, second, and third amounts of charge.

6. The touch screen controller of claim 1, wherein the accumulation stage further comprises a current to voltage converter configured to receive the accumulated output and process the accumulated output.

7. The touch screen controller of claim 1, wherein the accumulation stage subtracts the given amount of charge during the next accumulation when most significant bits of the touch strength value exceed the first threshold.

8. The touch screen controller of claim 1, wherein the analog to digital converter digitizes the accumulated output to produce the touch strength value via oversampling.

9. The touch screen controller of claim 1, wherein the input stage comprises a capacitance to current converter cascaded with a common mode feedback and offset cancelation circuit.

10. The touch screen controller of claim 1, wherein the accumulation stage is further configured to add a given amount of charge during a next accumulation when the touch strength value is less than a second threshold.

11. The touch screen controller of claim 1, wherein the first threshold is a non-zero threshold.

12. The touch screen controller of claim 1, wherein the accumulation stage subtracts the given amount of charge during the next accumulation only when the touch strength value exceeds the first threshold.

13. A method, comprising:
receiving a touch output from a touch matrix and conditioning the received touch output to produce a touch signal;
accumulating the touch signal to produce an accumulated output;
digitizing the accumulated output to produce a touch strength value;
performing a digital comparison of the touch strength value to a first threshold;
when the digital comparison indicates that the touch strength value exceeds the first threshold, subtracting a given amount of charge from the touch signal prior to accumulation using a first switched capacitor circuit; and
comparing the touch strength value to a second threshold less than the first threshold, and when the touch strength value exceeds the second threshold but does not exceed the first threshold, subtracting a second amount of charge from the touch signal using a second switched capacitor circuit different than the first switched capacitor circuit, the second amount of charge being different than the given amount of charge, wherein the given amount of charge is the second amount of charge.

14. The method of claim 13, further comprising comparing the touch strength value to a third threshold less than the second threshold, and when the touch strength value exceeds the third threshold but does not exceed the first threshold and the second threshold, subtracting a third amount of charge from the touch signal, wherein the given amount of charge is the third amount of charge, the third amount of charge being less than the second amount of charge.

15. The method of claim 14, wherein the second amount of charge is equal to one half of a first amount of charge, and wherein the third amount of charge is equal to one quarter of the first amount of charge.

16. The method of claim 13, wherein the first threshold is a non-zero threshold.

17. The method of claim 13, wherein the given amount of charge is subtracted during the next accumulation only when the touch strength value exceeds the first threshold.

18. A touch screen controller, comprising:
an accumulation stage configured to receive a touch signal and accumulate the touch signal to produce an accumulated output; and
a circuit configured to generate a touch strength value from the accumulated output;
wherein the accumulation stage comprises:
an accumulator circuit configured to receive the touch signal and accumulate the touch signal to produce the accumulated output;
a first switched capacitor circuit configured to subtract a first amount of charge from the accumulated output during a next accumulation when the touch strength value exceeds a first threshold;
a second switched capacitor circuit different than the first switched capacitor circuit and configured to subtract a second amount of charge from the accumulated output during said next accumulation when the touch strength value exceeds a second threshold less than the first threshold but does not exceed the first threshold, the second amount of charge being different than the first amount of charge; and
a third switched capacitor circuit different than the first and second switched capacitor circuits and configured to subtract a third amount of charge from the accumulated output during said next accumulation when the touch strength value exceeds a third threshold less than the second threshold but does not exceed the first threshold and the second threshold, the third amount of charge being different than the first and second amount of charges.

19. The touch screen controller of claim 18, wherein the second amount of charge is equal to one half of the first amount of charge, and wherein the third amount of charge is equal to one quarter of the first amount of charge.

20. The touch screen controller of claim 18, wherein at least one of the first, second, and third switched capacitor circuits contains a plurality of sub-switched capacitor circuits each being capable of subtracting an associated one of the first, second, and third amounts of charge.

21. The touch screen controller of claim 18, wherein the first threshold is a non-zero threshold.

22. The touch screen controller of claim 18, wherein the accumulation stage subtracts the given amount of charge during the next accumulation only when the touch strength value exceeds the first threshold.

23. A method, comprising:
accumulating a touch signal to produce an accumulated output;
digitizing the accumulated output to produce a touch strength value;
digitally comparing the touch strength value to an upper threshold, and subtracting a first amount charge from the accumulated output when the touch strength value is above the upper threshold using a first switched capacitor circuit;
digitally comparing the touch strength value to a middle threshold less than the upper threshold but greater than the lower threshold, and subtracting a second amount of charge from the accumulated output when the touch strength value is above the middle threshold but less than the upper threshold using a second switched capacitor circuit different than the first switched capacitor circuit, the second amount of charge being less than the first amount of charge; and
digitally comparing the touch strength value to a lower threshold, and adding charge to the accumulated output when the touch strength value is below the lower threshold.

24. The method of claim 23, wherein the upper threshold and middle threshold represent a positive voltage value, and wherein the lower threshold represents a negative voltage value.

25. The method of claim 23, wherein the lower threshold is a non-zero threshold.

26. The method of claim 23, wherein the charge is added to the accumulated output only when the touch strength value is below the lower threshold.

27. An accumulation stage, comprising:
an accumulator circuit configured to receive a touch signal and accumulate the touch signal to produce an accumulated output;
a first switched capacitor circuit configured to subtract a first amount of charge from a next accumulated output when the accumulated output exceeds a first threshold, the next accumulated output being produced from a next touch signal;
a second switched capacitor circuit configured to subtract a second amount of charge from the next accumulated output when the accumulated output exceeds a second threshold less than the first threshold but does not exceed the first threshold, wherein the second amount of charge is different than the first amount of charge, wherein the second switched capacitor circuit is distinct from the first switched capacitor circuit and spaced apart from the first switched capacitor circuit; and
a third switched capacitor circuit configured to subtract a third amount of charge from the next accumulated output when the accumulated output exceeds a third threshold less than the second threshold but does not exceed the first threshold and the second threshold, wherein the third amount of charge is different than the second amount of charge and the first amount of charge, wherein the third switched capacitor circuit is distinct from the second switched capacitor circuit and spaced apart from the second capacitor circuit, wherein the third switched capacitor circuit is distinct from the first switched capacitor circuit and spaced apart from the first capacitor circuit.

28. The accumulation stage of claim 27, wherein the second amount of charge is equal to one half of the first amount of charge, and wherein the third amount of charge is equal to one quarter of the first amount of charge.

29. The accumulation stage of claim 27, wherein the first switched capacitor circuit comprises a plurality of sub-switched capacitor circuits each being capable of subtracting the first amount of charge.

30. The accumulation stage of claim 27, wherein the second switched capacitor circuit comprises a plurality of sub-switched capacitor circuits each being capable of subtracting the second amount of charge.

31. The accumulation stage of claim 27, wherein the third switched capacitor circuit comprises a plurality of sub-switched capacitor circuits each being capable of subtracting the third amount of charge.

32. The accumulation stage of claim 27, wherein the first threshold is a non-zero threshold.

33. The accumulation stage of claim 27, wherein the switched capacitor circuit subtracts the first amount of charge from the accumulated output only when the accumulated output exceeds the first threshold; wherein the second switched capacitor circuit subtracts the second amount of charge from the accumulated output only when the accumulated output exceeds the second threshold; and wherein the third switched capacitor circuit subtracts the third amount of charge from the accumulated output only when the accumulated output exceeds the third threshold.

34. An accumulation stage, comprising:
an accumulator circuit configured to receive a touch signal and accumulate the touch signal to produce an accumulated output;
a first switched capacitor circuit configured to add a first amount of charge to the accumulated output when the accumulated output is below a first threshold;
a second switched capacitor circuit different than the first switched capacitor circuit and configured to add a second amount of charge to the accumulated output when the accumulated output is below a second threshold less than the first threshold, the second amount of charge being different than the first amount of charge; and
a third switched capacitor circuit different than the first and second switched capacitor circuits and configured to add a third amount of charge to the accumulated output when the accumulated output is below a third threshold less than the second threshold, the third amount of charge being different than the first and second amounts of charge.

35. The accumulation stage of claim 34, wherein at least one of the first, second, and third switched capacitor circuits contains a plurality of sub-switched capacitor circuits each being capable of adding an associated one of the first, second, and third amounts of charge.

36. The accumulation stage of claim 34, wherein the first threshold is a non-zero threshold.

37. The accumulation stage of claim 34, wherein the switched capacitor circuit adds the first amount of charge to the accumulated output only when the accumulated output is below the first threshold; wherein the second switched capacitor circuit adds the second amount of charge to the accumulated output only when the accumulated output is below the second threshold; and wherein the third switched capacitor circuit adds the third amount of charge to the accumulated output only when the accumulated output is below the third threshold.

* * * * *